(No Model.) 6 Sheets—Sheet 1.

J. H. PENDLETON & A. BRYSON, Jr.
MEANS FOR OPERATING TRAINS UPON CABLE RAILWAYS.

No. 404,497. Patented June 4, 1889.

Fig. 1.

Witnesses.
Chas H. Smith
J. Staib

Inventors
John H. Pendleton
Andrew Bryson Jr.
per Lemuel W. Serrell atty (No Model.) 6 Sheets—Sheet 2.

J. H. PENDLETON & A. BRYSON, Jr.
MEANS FOR OPERATING TRAINS UPON CABLE RAILWAYS.

No. 404,497. Patented June 4, 1889.

(No Model.) 6 Sheets—Sheet 3.

J. H. PENDLETON & A. BRYSON, Jr.
MEANS FOR OPERATING TRAINS UPON CABLE RAILWAYS.

No. 404,497. Patented June 4, 1889.

Witnesses
Chas H. Smith
J. Staib

Inventors
John H. Pendleton
Andrew Bryson, Jr.
per Lemuel W. Serrell
atty

(No Model.) 6 Sheets—Sheet 4.

J. H. PENDLETON & A. BRYSON, Jr.
MEANS FOR OPERATING TRAINS UPON CABLE RAILWAYS.

No. 404,497. Patented June 4, 1889.

Witnesses
Chas H Smith
J. Haib

Inventors.
John H. Pendleton
Andrew Bryson Jr.
per Lemuel W. Serrell
atty

UNITED STATES PATENT OFFICE.

JOHN H. PENDLETON, OF BROOKLYN, AND ANDREW BRYSON, JR., OF NEW YORK, ASSIGNORS TO THE RAPID TRANSIT CABLE COMPANY, OF NEW YORK, N. Y.

MEANS FOR OPERATING TRAINS UPON CABLE RAILWAYS.

SPECIFICATION forming part of Letters Patent No. 404,497, dated June 4, 1889.

Application filed July 21, 1888. Serial No. 280,652. (No model.)

*To all whom it may concern:*

Be it known that we JOHN H. PENDLETON, of Brooklyn, in the State of New York, and ANDREW BRYSON, Jr., of the city and State of New York, have invented an Improvement in Means for Operating Trains upon Cable Railways, of which the following is a specification.

We make use of a car, which we term a "motor-car," and this car contains a gripping device, so that said car can be connected to and be drawn by the endless traveling cable. One of these cars forms part of each train of cars, and said motor-car, as drawn along by the traveling cable either draws or pushes the train of cars along, for only the motor-car is connected to the cable. Said motor-car also contains a tank for compressed air, and air is forced into this tank by a pump or pumps as the car is drawn along, the pumps being operated by connections from an axle or wheels of the car. When the maximum pressure of air in said tank is reached, a cock is turned automatically and prevents any more air being forced into the tank until the pressure diminishes. When this occurs, the cock is opened automatically and the pumping and forcing of air into the tank is continued. The compressed air in the tank is used for operating the grip upon the motor-car, for operating the brakes upon the cars of the train connected to said motor-car, and for signaling by means of a whistle. The air pipes and cylinders of the brake system of the train are connected with the air-tank on the motor-car, and the engineer in the cab of said motor-car controls the working of said brakes. When the air from the storage-tank is allowed to pass into the pump, before referred to, said pump becomes an air-engine, and said air-engine can be used as a motor to propel the car and its train short distances, such as in starting the train to get it in motion before connecting the motor-car to the cable, and also at terminals of the road or other places to move the train from one track to the other or to sidings.

$a\ a$ represents the cross-ties of an elevated-railway structure, $b$ the rails thereon, and $c$ the endless traveling cable.

The frame of the motor-car is composed of the longitudinal beams $d\ d$ and $e\ e$, transverse beams $f\ f$, tie-bars $h\ h$, and end sills $g\ g$.

$i$ is the cab of the motor-car, and $i'$ the flooring to the same.

As the motor-car is small in comparison with the usual passenger-car, it is unnecessary to use more than two pairs of car-wheels. These wheels are shown at $b'\ b'$ upon axles $b^2\ b^2$, supported in journal-boxes $b^3\ b^3$ in pedestals of usual character upon the beams $e\ e$. Coupling devices are provided at $c'$ upon each end sill $g$, so that a train of cars can be connected to either end of the motor-car.

We prefer that the gripping device shown and described in an application for patent, Serial No. 280,658, filed July 21, 1888, be employed upon the motor-car, for said grip has a clamping-surface of several feet in length, which, with the great clamping-power of said grip, insures an unusually firm hold on the cable. A grip of this character is essential with our present invention, because as there are no grips used upon the train of cars connected to the motor-car it is absolutely necessary that the gripping device upon the motor-car, which motor-car draws or pushes the train of cars connected to it, shall be of the most reliable character. The grip is composed of a stationary portion $d'$, supported by the beams $f$ and tie-bars $h$ and a moving portion $d^2$ fitted to swing upon the shaft $d^3$. The under surface of the stationary portion $d'$ is grooved for the passage of an endless belt $d^4$, and the exterior surface of the belt has a semicircular groove running lengthwise of the belt. The lower portion of the moving part $d^2$ of the grip is made as a hook $d^5$, which also has a semicircular groove in its upper surface, and when the grip is applied to connect the motor-car to the cable the hook lifts the cable to the position shown in Fig. 1, and the cable occupies the groove in the endless belt and hook, respectively, and as the hook clamps the cable to the endless belt the latter is clamped to the stationary part $d^2$ of the grip. The endless belt $d^4$ is supported by the drums $h'\,h'$, and it is set in motion prior to the grip being applied through the wheels $h^{12}$, pulleys $h^2\,h^4$, and belts $h^3$, respectively, so that it will be moving at about the same speed as the cable when the hook is brought into contact with it. The devices for bringing the wheels $h^{12}$ in contact with the cable to put the endless belt in motion are not shown, and as these features are not claimed herein it is unnecessary to describe them further, and a reference is hereby made to said application, No. 280,658, filed July 21, 1888, for a description of said devices, and also for a description of the means for raising and lowering the moving part of the grip.

$l\,l$ are cylinders fitted to oscillate upon trunnions $l^2\,l^3$ in bearings $l^4\,l^5$, bolted to the beams $f\,f$, and the pistons $l^r\,l^r$ of these cylinders have rods $l^6\,l^6$ passing through stuffing boxes or glands, and said rods are connected to cranks $l^8\,l^8$ upon one of the axles $b^2$ of the car-wheels. These cranks are at ninety degrees apart to assist each other in passing dead-centers.

As the cylinders $l\,l$ and parts connected with each are exactly alike, it will only be necessary to describe one of said cylinders and its parts.

The cylinder $l$ has two ports 2 3, extending nearly the entire length of the cylinder, and there are openings from the interior of the cylinder to said ports 2 3, and these openings have valve-seats and valves 4, 5, 6, and 7. The face of the end of the trunnion $l^2$ is perfectly smooth and flat, and said face is kept in contact with a correspondingly smooth and flat face upon the bearing $l^4$ by the screw $l^9$, which acts upon the end of the trunnion $l^3$. In this bearing $l^4$ there is a vertical opening for the cock $p'$, and a second opening or passage-way at $p^2$, at the bottom of which is a valve-seat and valve $p^3$. $p^4$ is a port or passage-way, partly in the cylinder $l$ and partly in the bearing $l^4$, and this port connects the port 3 with the opening $p^2$. The port $p^4$ where it passes from the cylinder $l$ to the bearing $l^4$ is at the axial line of the trunnions of the cylinder; hence the oscillation of the cylinder does not affect this port, and said port always remains open at the face $l^{28}$ of the bearing $l^4$ and the end of the trunnion $l^2$.

$p^5$ is a pipe connecting the cylinder $l$ at the opening $p^2$ with the storage-tanks T, and $p^6$ is a passage-way leading from the port 2 and opening into the atmosphere, and this passage-way is opened or closed by the cock $p^7$. Presuming that the cock $p'$ occupies the position shown in Fig. 9, it is now to be understood that when the motor-car is connected to the traveling cable by the grip and said car is in motion the cranks upon the car-axle will move the piston-rods and pistons $l^7$ back and forth in their cylinders, and air will be pumped in the tanks T, as follows: The air is drawn in from the atmosphere through the cock $p^7$ and passage-way $p^6$ into the port 2, and as a valve 4 or 5 lifts, said air passes into the interior of the cylinder, and is then forced into the port 3 as a valve 6 or 7 is raised. From the port 3 the air passes into the branch port $p^4$, past the check-valve $p^3$, to the passage-way $p'$, and by the pipe $p^5$ to the tanks T, the check-valve $p^3$ being lifted at each complete movement of the piston $l^7$.

In order to stop automatically the pumping of air into the tanks as soon as the maximum amount of air has been forced into said tanks, we provide the means next described. There is a cylinder $n'$ beneath and in line with the trunnions of each cylinder. We have shown this cylinder as made in one with the bearing $l^5$, and the ends of this cylinder are closed by heads. $n^2$ is a piston within said cylinder, and its rod $n^3$ passes through one of said heads, and is connected to a ∪-shaped slide $n^4$, that is fitted to move back and forth upon a guide-bar $n^5$, bolted to the cylinder $n'$ and bearing $l^4$. There is a spring $n^{15}$ around the piston-rod and between the piston and one head of the cylinder, and there is a pipe $n^6$ passing through the other head of the cylinder, and said pipe is connected to the tanks T; hence there is the same pressure of air upon the piston $n^2$ as there is pressure of air in the tanks T. The cock $p^7$, before referred to, has a stem $n^7$, the outer end of which is supported in a bracket upon the under side of the cylinder $l$, and there is an arm $n^8$ depending from said stem, and its end is between the two vertical portions of the ∪-shaped slide $n^4$. It will now be apparent that the pressure of the spring $n^{15}$ tends to move the piston $n^2$, rod $n^3$, and slide $n^4$ in one direction, and that the pressure of air in the tanks acts upon said piston and tends to move said piston, rod, and slide in the other direction; hence the stem and cock $p^7$ will be turned in one direction or the other and the cock more or less opened or closed, according as the air-pressure or pressure of the spring is the greatest.

When the maximum amount of air has been forced into the tanks, the piston $n^2$ will be moved such a distance by the pressure of the air against it that the cock $p^7$ will be turned so as to entirely close the passage-way $p^6$, and no more air can be forced into the tanks while such pressure continues in the tanks, and during this time the pistons $l^7$ will move back and forth in partial vaccuo in their cylinders, the air remaining in the cylinder and ports being sufficient to cushion the piston in its movements. As soon as the air-pressure diminishes from using the air in operating the brakes, or in starting the train of cars, or for other uses to which said compressed air may be applied in operating the train, then the spring $n^{15}$ forces the piston $n^2$ back more or less, and the cock $p^7$ is opened porportionally and the pumps again commence to force air into the tanks, as aforesaid.

In order that the pump-cylinders may be used as air-engines, we make each cylinder $l$ and its parts as next described.

8 and 9 are ports partly in the cylinder $l$ and partly in the trunnion $l^2$. Said ports open into the cylinder at opposite ends thereof, and the other ends of the ports open at the end of the trunnion $l^2$ at diametrically-opposite points and in line with circular passage ways or ports 10 11, formed in the face $l^{28}$ of the bearing $l^4$. These passage-ways 10 and 11 are separated by the abutments 13 and 14, Fig. 7.

15 and 16 are ports in the bearing $l^4$, and one end of these ports open into the passage-ways 10 11.

17 and 18 are ports in the cock $p'$.

19 is an opening from the passage-way $p^2$ to the cock $p'$, and 20 is an opening in the barrel of the cock.

Figure 4:
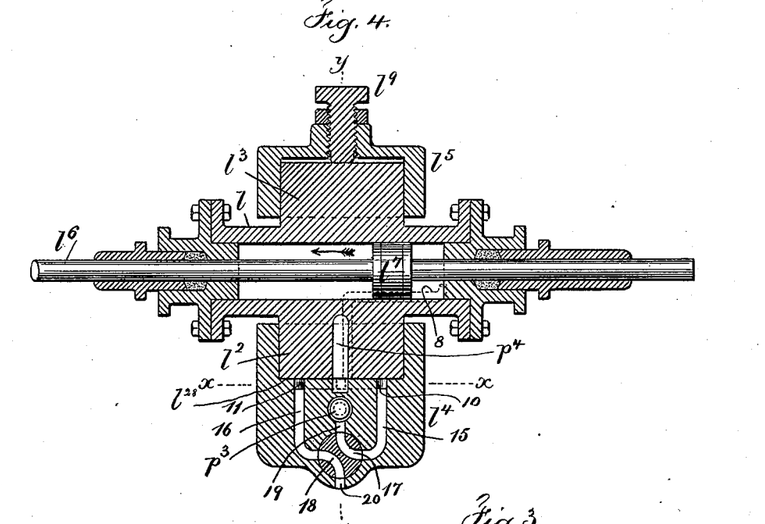
Fig. 4 is a horizontal section of the same.
Figure 5:
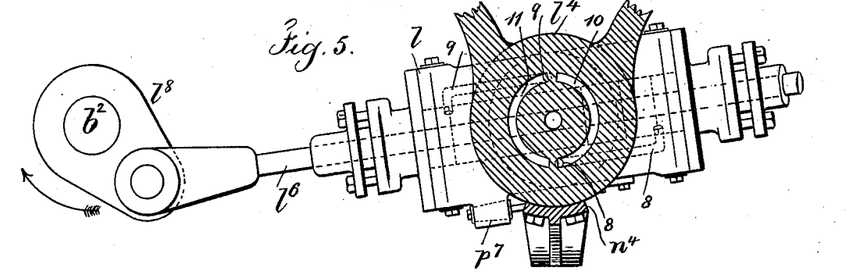
Fig. 5 is a section at the line $x\ x$ of Fig. 4.
Figures 6, 7:
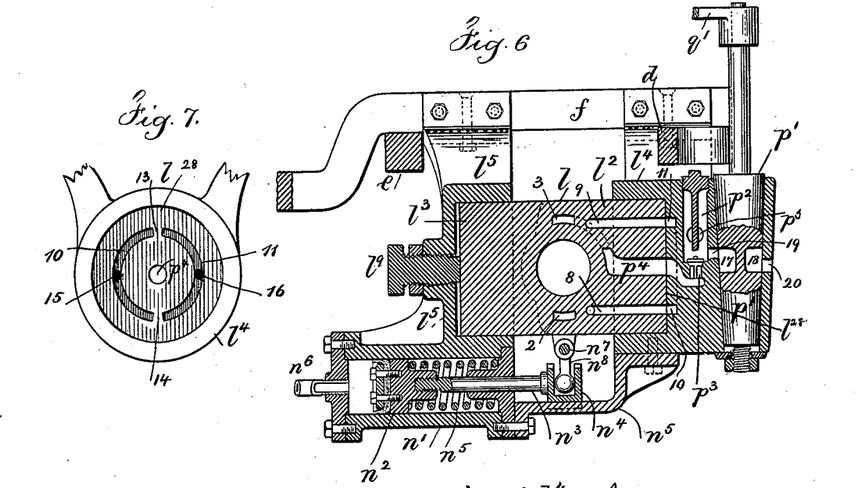
Fig. 6 is a section at the line $y\ y$ of Fig. 4.
Fig. 7 is an end view of the bearing for one of the trunnions of the oscillating cylinder.
Figures 8, 9, 10:
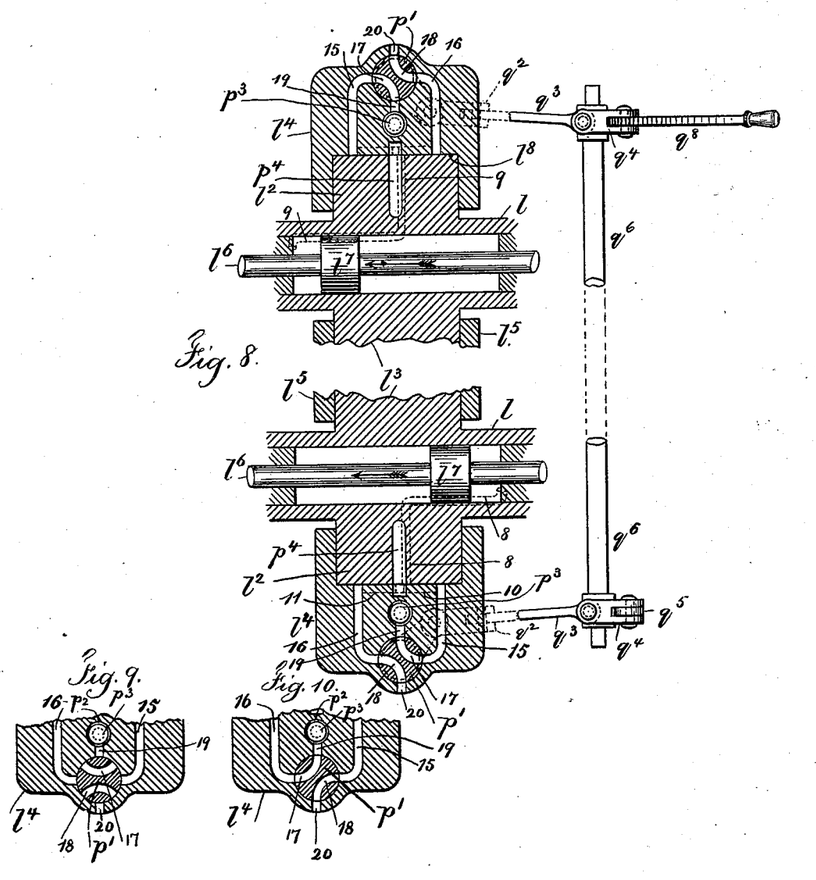
Fig. 8 is a horizontal section showing portions of two oscillating cylinders and their bearings and the connections for operating the cocks of said cylinders.
Fig. 9 is a section showing the position of the cock when the cylinder is used for pumping.
Fig. 10 is a section showing the position of the cock to reverse the motion given by the engine to that given when the cock is in the position of Figs. 3, 4, 5, 6, and 8.

When it is desired to propel the car by the air-engines, the cocks $p'$ are turned from the position shown in Fig. 9 to that shown in Figs. 4, 6, and 8, and the compressed air from the tanks T passes from the passage-way $p^2$ through the opening 19 into the port 17 of the cock $p'$, and by the port 15 into the passage-way 10, and by the port 8 into the cylinder $l$, and the piston $l^7$ is moved in the direction of the arrow, Figs. 4 and 8. The exhaust is by the port 9, passage-way 11, ports 16 and 18, and opening 20 into the atmosphere. As the piston $l^7$ approaches the end of its stroke the oscillation of the cylinder bring the ports 8 9 gradually behind the abutments 13 14, and when the crank reaches its dead-center said ports are entirely closed by said abutments. As the crank passes said dead-center said ports gradually open into the passage-ways 10 11; but now it is the port 9 that opens into the passage-way 10, and the port 8 opens into the passage-way 11, and the air from the tank passes through $p^2$ 19 17 15 10 9 into the cylinder $l$, and the piston $l^7$ is moved to the right, the exhaust being by 8 11 16 18 and 20 to the atmosphere. When the piston reaches its extreme movement to the right, then the oscillation of the cylinders brings the ports 8 and 9 so that they again open into 10 and 11, respectively, and the air passes into the cylinder $l$ to move the piston $l^7$ to the left, as first described. With the cocks $p'$ in the position shown in Figs. 4, 6, and 8 the air-engine turns the cranks $l^8$ in the direction of the arrow shown in Fig. 5.

When it is desired to propel the car in the reverse direction, the cock $p'$ of each cylinder $l$ is turned from the position Figs. 4, 6, and 8 to the position shown in Fig. 10, so that the ports 17 and 18 of each cock $p'$ coincide with 16 and 15, respectively. With said cocks $p'$ in this position the air from the tanks passes through the ports $p^2$, 19, 17, 16, 11, and 9 to the interior of each cylinder and moves the pistons $l^7$ to the right, and the exhaust is by 8, 10, 15, 18, and 20 to the atmosphere. When the piston reaches its extreme of movement to the right, the oscillation of the cylinder causes the ports 8 and 9 to open into 11 and 10, respectively, and the air from the tanks passes through $p^2$, 19, 17, 16, 11, and 8 into the cylinder $l$, and the piston is moved to the left, and the exhaust is by 9, 10, 15, 18, and 20 to the atmosphere.

By the aforesaid arrangement of ports, valves, and cocks the cylinders $l$ and their pistons may be used either as pumps to force air into the storage tanks or as engines to propel the car and its train short distances by simply turning the cocks $p'$ to the proper position.

In order to move both cocks $p'$ simultaneously, we provide a crank-arm $q'$ at the upper end of the stem of each cock, and these crank-arms $q'$ are connected by links $q^2$ $q^3$ $q^4$ to crank-arms $q^5$ upon a rock-shaft $q^6$, supported in bearings upon the beams $d\,d$. One of the crank-arms $q^5$ is extended in the form of a lever-handle $q^8$, and the engineer, by moving this lever, turns both cocks $p'$ simultaneously and brings them to the desired position.

The valves 4, 5, 6, and 7 are not moved when the cylinders $l$ are used as air-engines, for the pressure of the air in the interior of said cylinders keeps the valves 4 and 5 to their seats, while the air confined in the port 3 keeps the valves 6 and 7 to their seats.

Figure 11:
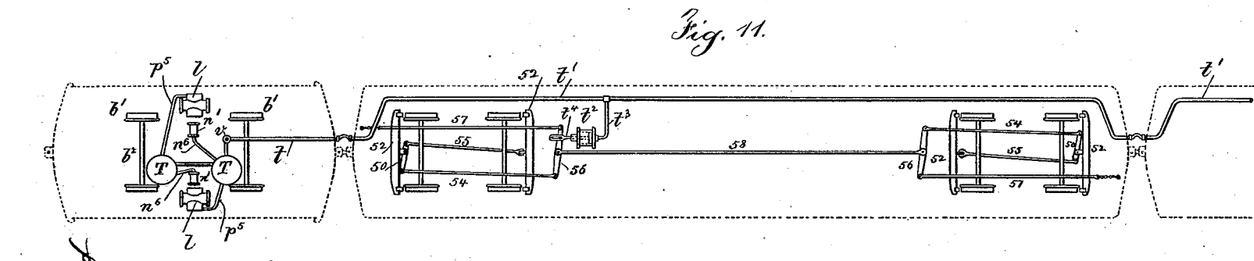
Fig. 11 is a diagrammatic view representing the motor-car and part of the train of cars connected to said motor-car, and illustrating the pipe-connections from the storage-tanks to the combined air pump and engine and to the brake-cylinders of the train.

To operate from the motor-car the brakes upon the cars connected to said motor, we arrange the parts as illustrated in Fig. 11, in which the outline of the cars is represented by dotted lines. Upon the motor-car there is a pipe $t$, having a cock at $v$, and one end of said pipe is connected to the storage-tanks T, and the other end is connected by a flexible coupling to a pipe $t'$ of the car next to the motor-car. Each car of the train is provided with a pipe $t'$, that extends the entire length of the car, and with a cylinder $t^2$ and a pipe $t^3$, connecting the cylinder $t^2$ with the pipe $t'$. The respective pipes $t'$ are connected to each other by flexible couplings; hence the pipes $t$ and $t'$ are the same as one pipe, extending from the storage-tanks through the entire train of cars. The extreme end of the pipe $t'$ upon the last car of the train must be closed air-tight. Each cylinder $t^2$ is provided with a piston and rod $t^4$, and the latter is connected to a lever 56 of the usual system of levers and links 50, 54, 55, 57, and 58, for operating the brakes 52.

Figure 12:
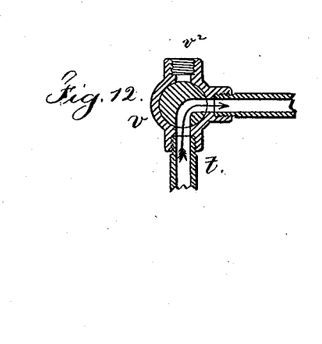
Figs. 12 and 13 are sections in larger size of the cock that controls the brake mechanism.

When it is desired to apply the brakes, the engineer turns the cock $v$ to the position shown in Fig. 12, and the compressed air from the tanks T passes through the pipes $t$, $t'$, and $t^3$ and into the cylinders $t^2$ upon the respective cars, and the air acts upon the pistons of said cylinders and moves said pistons and their rods to the left, and by the levers and links 56, 54, 50, 55, 57, and 58 forces the brakes 52 against the wheels of the cars.

Figure 13:
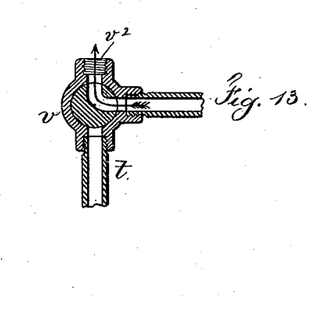

To take off the brakes, the engineer turns the cock $v$ to the position shown in Fig. 13, which shuts off the supply of air from the tanks T, and the compressed air in the cylinders $t^2$ and pipes now escapes into the atmosphere by passing through the cock $v$ and an opening at $v^2$ in the barrel of the cock. The brakes and their parts and the pistons of the cylinders $t^2$ are returned to their normal position by springs, as usual, as soon as the air escapes from said cylinders.

Figure 1:
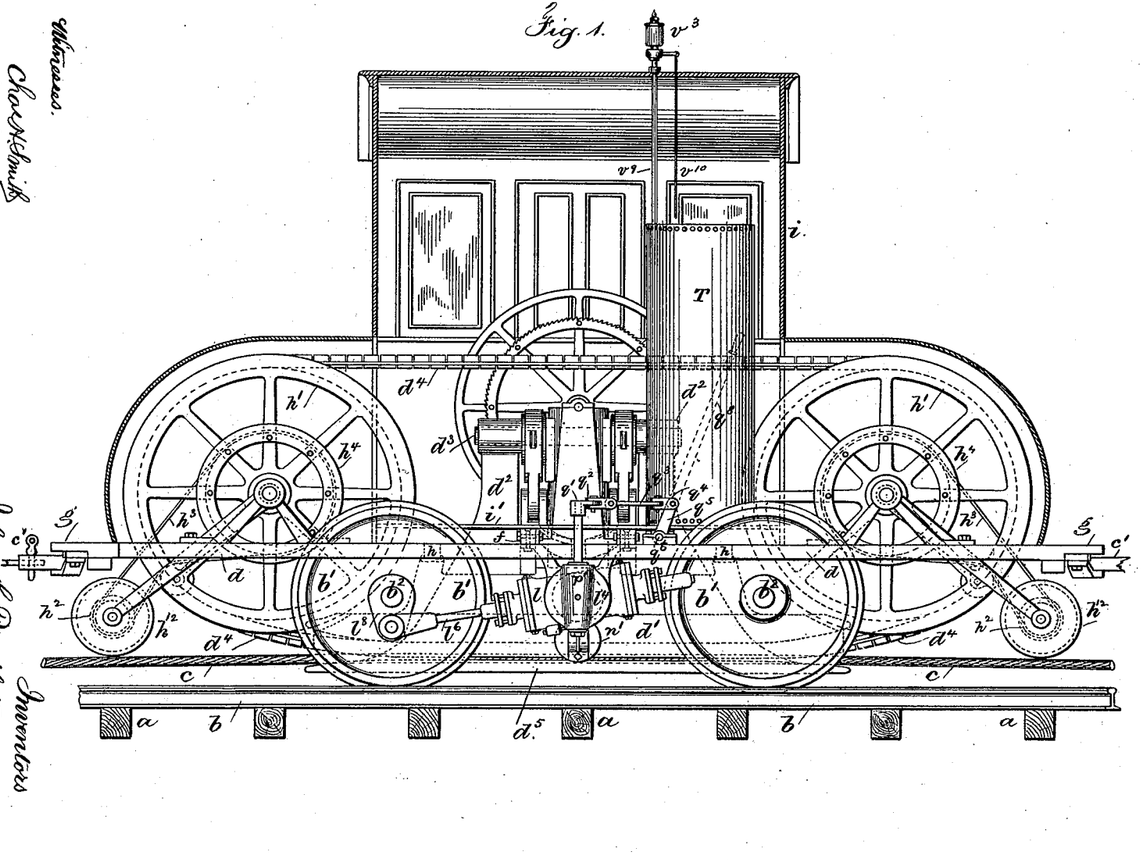
Figure 1 is an elevation, partially in section, of the motor-car and parts carried by it.
Figure 2:
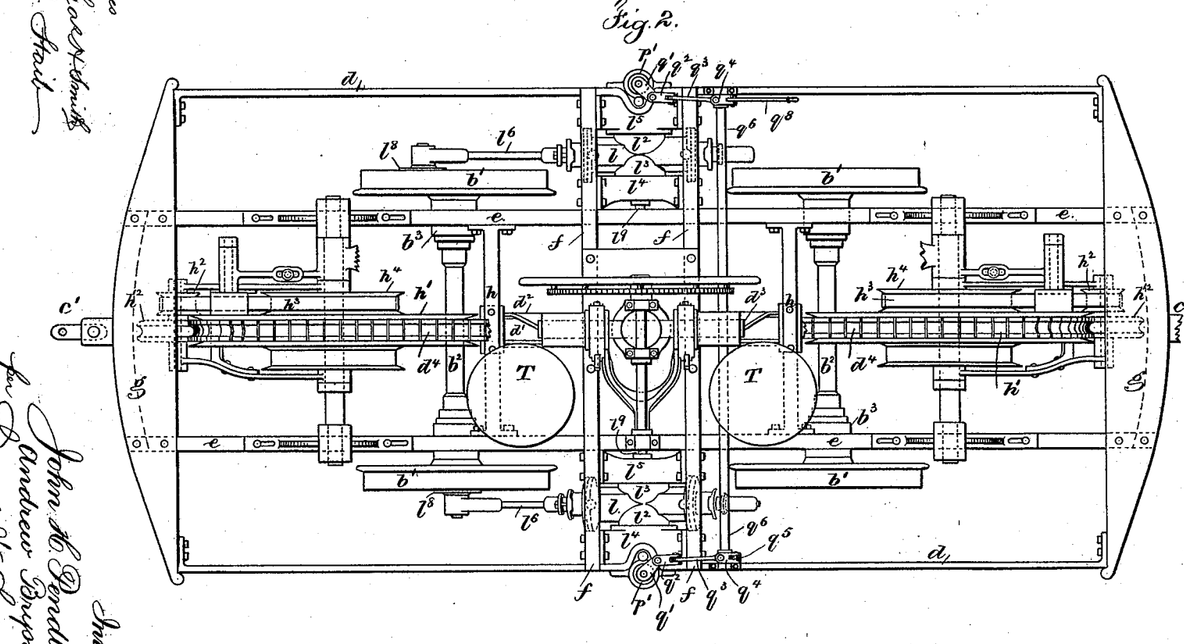
Fig. 2 is a plan view of the same, with the cab and flooring of the car removed.
Figure 3:
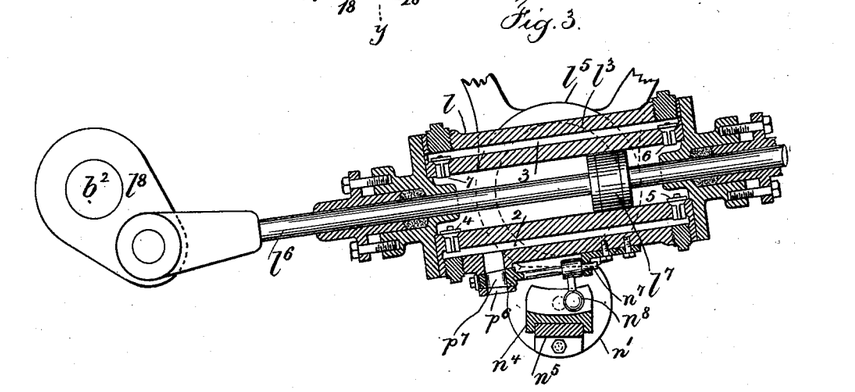
Fig. 3 is a vertical longitudinal section of the combined pump and air-engine cylinder.

We provide a whistle, as shown at $v^3$, Fig. 1. This whistle is similar in construction to the ordinary steam-whistle, and it is to be operated by compressed air from the tanks T. We have shown this whistle at the end of a pipe $v^9$ connected to one of the tanks T, and there is a cord $v^{10}$ hanging from the lever of the valve-whistle, and the engineer by pulling upon this cord opens said valve and the compressed air from the tank passes to the whistle and blows the same.

As we always have a constant supply of compressed air in the tanks T, the whistle $v^3$ may be operated at any time, and sound-signals may be given upon a cable railway the same as upon a steam-road.

Figure 14:
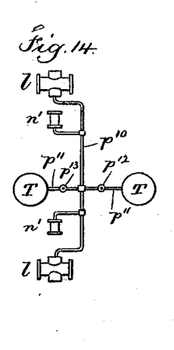

The cylinders $l$ and $n'$ may be connected with the air-tanks T, as shown in Fig. 14, so that one of the tanks may be kept as a reserve-tank, its supply of air to be used only when the supply of air in the other tank is exhausted. In said Fig. 14 we have shown a pipe $p^{10}$ extending from one cylinder $l$ to the other, with branches to the cylinders $n'$, and there is a pipe $p^{11}$ extending from tank to tank and connected with the pipe $p^{10}$, and in said pipe $p^{11}$ there are two cocks $p^{12}$ and $p^{13}$. Both cocks are to be open while the tanks are being filled with air, as before described, and when filled one cock must be closed, which closed cock—say $p^{12}$—will confine the air in the tank nearest to it. The air in the other tank can be used for operating the brakes, engine, or grip, and its supply as used will be constantly replaced by the pumps. If it should happen that the air in this tank should not be sufficient for the desired use, then the cock $p^{12}$ must be opened and the air from the reserve-tank can be used. As soon as the tanks are again filled with air then the cock $p^{12}$ must be closed, so as to again confine the air in the reserve-tank, and the air in the other tank is to be used for operating the engine, brakes, or other devices.

The motor-car may be provided with brakes to be operated by compressed air, or the speed of the motor-car when running alone or when connected to its train may be retarded or the car stopped after disconnection from the cable by the engineer moving the cock $p'$ so that the air will pass into the cylinders $l\,l$ and move their piston-rods and cranks so that the car-wheels of the motor-car will tend to rotate in the reverse direction to that in which they would naturally turn as the car moves along by momentum.

We claim as our invention—

1. The combination, with the endless traveling cable of the cable railway, the car wheels and axles of the motor-car and a grip for connecting the motor-car to the cable, of a reservoir upon said car for containing air under pressure, an air-pump oscillated by a connection to one of the car wheels or axle, a cock for admitting air to the pump, a pipe connecting the reservoir with the pump, a stationary cylinder and its piston and rod, a spring within said stationary cylinder and acting against its piston, a pipe connecting the stationary cylinder with said reservoir, and a connection from the stem of aforesaid cock to the piston-rod of the stationary cylinder, so that when air is being pumped into the reservoir said cock is more or less opened or closed automatically, according to the pressure of air in the reservoir, as set forth.

2. The combination, with the endless cable of the cable railway, the wheels and axles of the motor-car, and a grip for connecting said car to the cable, of the cylinders $l\,l$, and pistons $l^7$ and rods $l^6$ connected with the axle or wheels of the car, bearings for said cylinders, valves and ports in said cylinders and bearings, a reservoir for compressed air connected with said cylinders, the cocks $p'\,p'$ and crank-arms $q'\,q^5$, links $q^2\,q^3\,q^4$, and rock-shaft $q^6$, for operating the cocks $p'\,p'$ simultaneously, as set forth.

3. The combination, with the cylinder $l$ and its pistons and rod and bearings for said cylinder, of the ports 2 3, valves 4, 5, 6, and 7, branch port $p^4$, port or passage-way $p^2$, and check-valve $p^3$, the cylinder $n'$, piston $n^2$, rod $n^3$, and spring $n^5$, the cock $p^7$, an arm connecting the rod $n^7$ and stem of said cock, and connections from the cylinders $l$ $n'$ to an air-reservoir, substantially as and for the purposes specified.

4. The combination, with the cylinder $l$ and its piston and rod, a connection from said cylinder to an air-reservoir, and the ports 2, 3, $p^4$, 8, and 9, valves 4, 5, 6, and 7 in said cylinder $l$, of the bearing $l^4$, having the ports or passage-ways 10 11 15 16 19 $p^2$, the check-valve $p^3$, the cock $p'$, having the passage-ways 17 18, and the barrel of said cock having an exhaust-opening, substantially as and for the purposes set forth.

Signed by us this 19th day of July, 1888.

J. H. PENDLETON.
A. BRYSON, JR.

Witnesses:
GEO. T. PINCKNEY,
WILLIAM G. MOTT.